Figure 1:
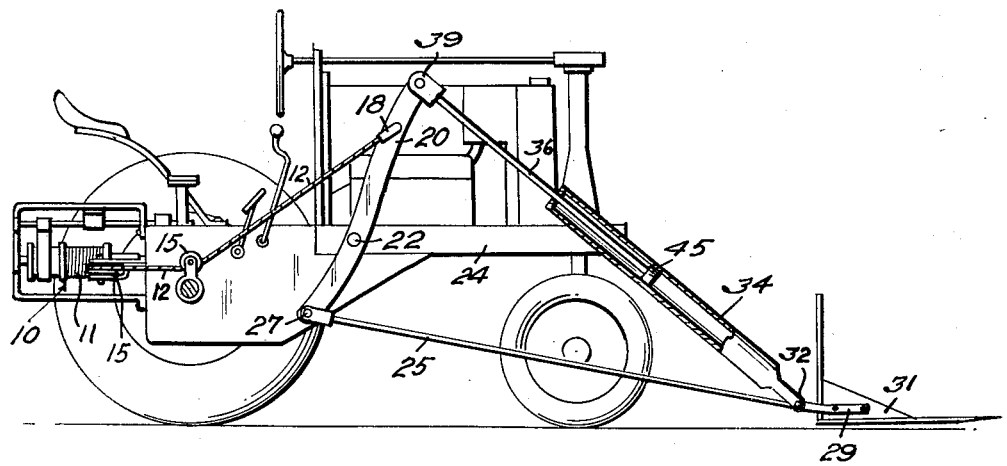

Nov. 28, 1950 L. W. SMITH 2,531,993
TRACTOR OPERATED LOADING DEVICE
Filed March 21, 1947 3 Sheets-Sheet 1

Inventor
Louie W. Smith
By Randolph & Beavers
Attorneys

Nov. 28, 1950 L. W. SMITH 2,531,993
TRACTOR OPERATED LOADING DEVICE
Filed March 21, 1947 3 Sheets-Sheet 2
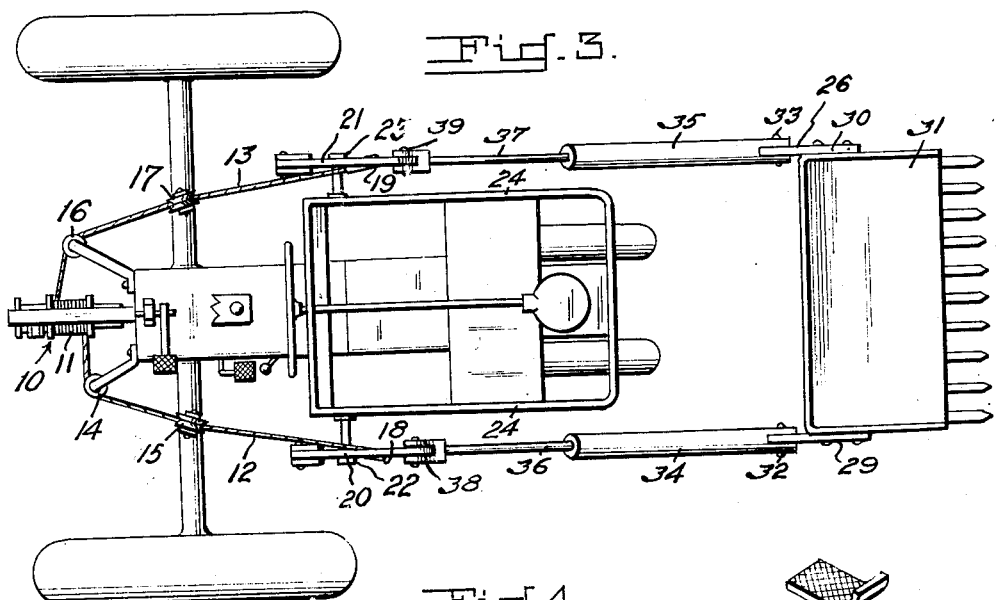
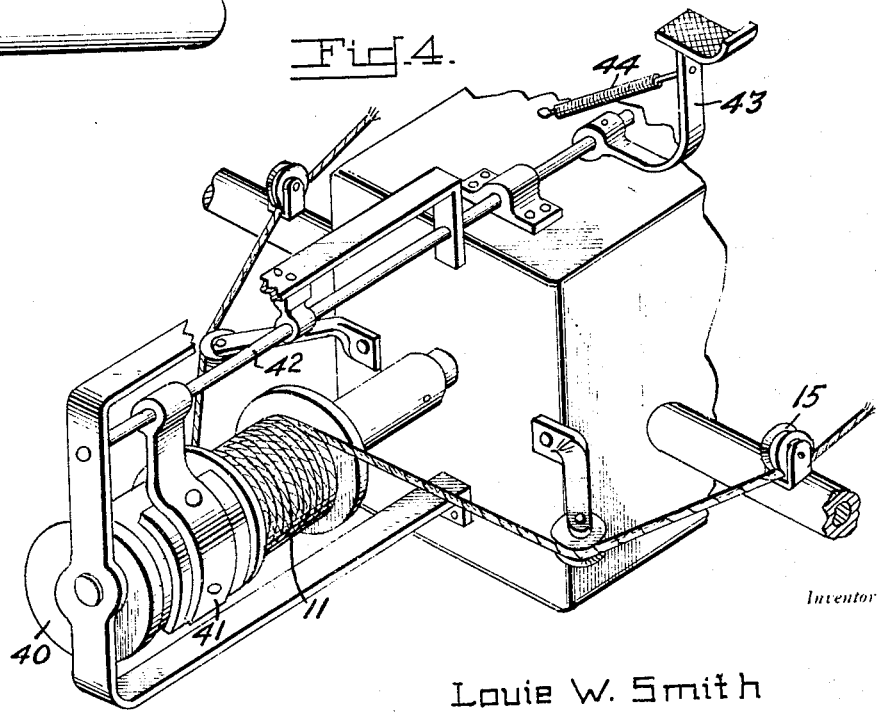
Inventor
Louie W. Smith
By Randolph & Beavers
Attorneys Nov. 28, 1950 — L. W. SMITH — 2,531,993
TRACTOR OPERATED LOADING DEVICE
Filed March 21, 1947 — 3 Sheets-Sheet 3
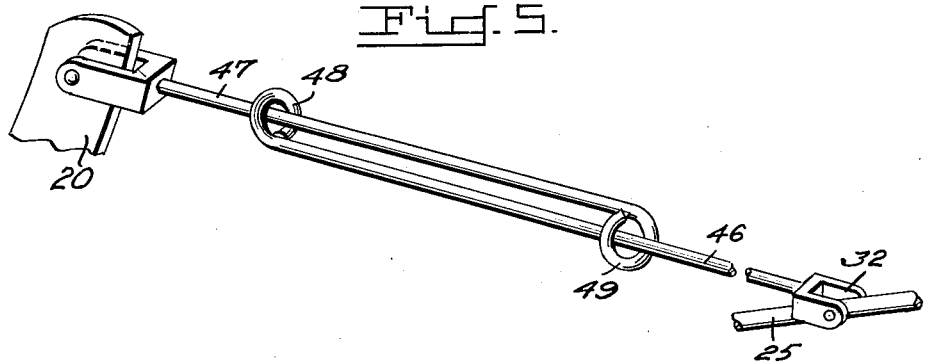
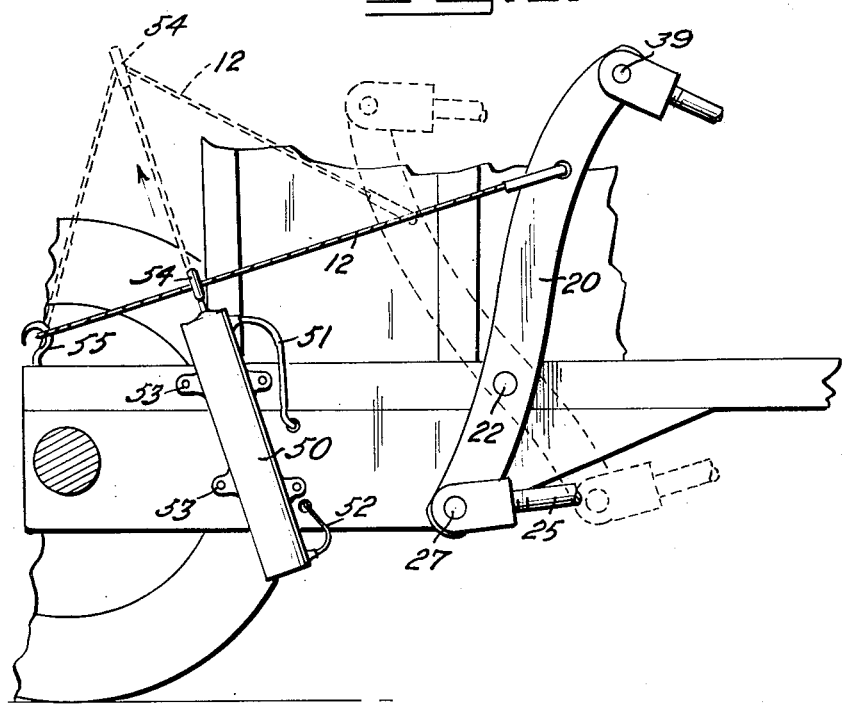
Inventor
Louie W. Smith
By Randolph & Beavers
Attorneys Patented Nov. 28, 1950

2,531,993

UNITED STATES PATENT OFFICE 2,531,993

TRACTOR OPERATED LOADING DEVICE

Louie W. Smith, Fort Dodge, Iowa

Application March 21, 1947, Serial No. 736,324

6 Claims. (Cl. 214—131)

The present invention relates to tractor operated loading devices and it consists in the combinations, constructions and arrangements of parts herein described and claimed.

Generally the invention comprises a loading device adapted to be powered by the power take-off usually associated with tractors of the farm type. The loading mechanism is mounted at the sides of the tractor and is provided with a shovel, rake or the like extending from the front end of the tractor. The principal feature of the present invention is the provision of means whereby a shovel, rake or the like may be moved forwardly by the power generated by the tractor without the necessity for moving the tractor itself. This is accomplished by means of a pair of cable operated levers pivoted to the sides of the tractor the lower end of which levers are provided with pivotally connected rods which upon the retraction of the upper ends of the levers will move forward and cause the shovel or rake to likewise move in a forward direction. To the upper ends of the levers are pivotally connected rods which are provided with detents at their outer ends and which rods are slidably mounted within cylindrical members pivotally connected to the rods which move the shovel or rake in a forward direction. Upon further movement of the levers aforesaid the detents engage the upper ends of the cylindrical members and cause a lifting of the shovel or rake. Instead of utilizing the power take-off ordinarily associated with farm tractors, the power of the tractor may be used to operate a hydraulic means for moving the levers above referred to.

It is accordingly an object of the invention to provide, in combination with a tractor, a shovel, rake or the like which may be moved in a forward direction while in its lowered position without movement on the part of the tractor.

A further object of the invention is the provision of novel means for imparting motion to a device of the character above described.

A further object of the invention is the provision of novel means for delaying the lifting action of a shovel, rake or the like until a forward motion has been completed.

A further object of the invention is the provision of novel means for equalizing the tension or power applied to the opposite sides of a lifting mechanism.

Figure 2:
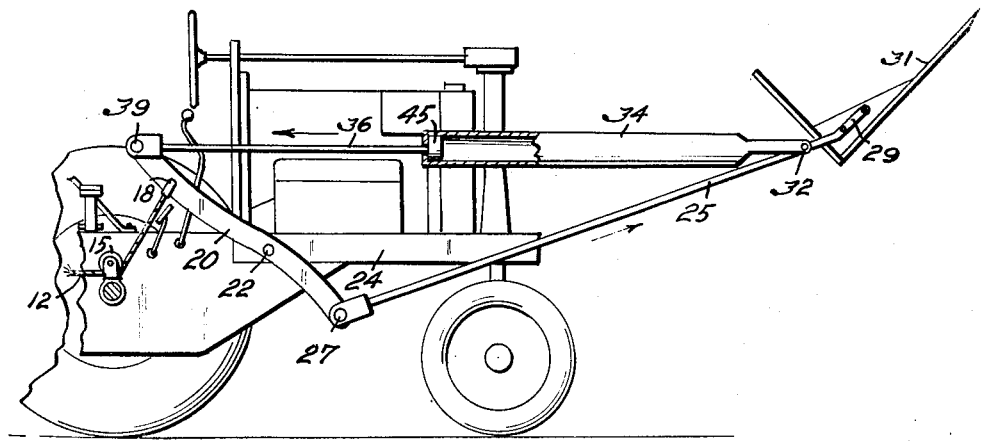

Other and further objects of the invention will become apparent from a reading of the following specification taken in conjunction with the drawings, in which:

Figure 1 is a side elevational view, partly broken away, of an embodiment of the invention, Figure 2 is a view similar to Figure 1 showing the device in one of the operative positions it may assume, Figure 3 is a plan view of Figure 1, Figure 4 is a fragmentary isometric view illustrating certain details of the invention, Figure 5 is a fragmentary perspective view illustrating a modified form the invention may take, and Figure 6 is a fragmentary elevational view of a modified form of the invention.

Referring more particularly to the drawings, there is shown therein a tractor provided with a power take-off 10 including a drum 11 upon which is adapted to be wound cables 12 and 13 which are trained over pulleys 14 and 15 and pulleys 16 and 17, respectively, and which terminate in permanent connections 18 and 19 with the upper portions of levers 20 and 21, respectively.

The levers 20 and 21 are pivoted as indicated at 22 and 23, respectively, to the framework 24 of the tractor and to their lower ends are respectively revolubly connected rods 25 and 26 as indicated at 27 and 28, respectively. The opposite or outer ends of the rods 25 and 26 terminate in brackets 29 and 30, respectively, which brackets are bolted or otherwise fastened to a shovel 31 or the like.

Adjacent the outer ends of the rods 29 are pivotally affixed as indicated at 32 and 33, respectively, cylindrical members 34 and 35 within which are respectively slidably mounted rods 36 and 37. The rods 36 and 37 are pivotally connected as indicated at 38 and 39, respectively, to the upper extremities of the levers 20 and 21.

Associated with the drum 11 is a brake drum 40 having a brake 41 which is mounted upon a brake rod 42 and adapted to be moved into contact with the drum by means of a foot operated lever 43 which is normally held by means of a spring 44 in inoperative position.

In operation it will be apparent that power is first applied to the drum 11 to retract the cables 12 and 13 which will cause a rearward movement of the upper portions of the levers 20 and 21 and a forward movement of the lower portions of said levers thereby causing a forward movement of the rods 25 and 26 and, consequently, a forward movement of the shovel without any movement on the part of the tractor itself. Upon further retraction of the cables 12 and 13, detents 45 mounted upon the outer ends of the rods 36 and 37 will come into contact with the inner ends of the cylindrical members 34 and 35 and thus cause an upward movement of the shovel 31.

In Figure 5 there is shown a modified form of connection for creating the delayed action in lifting as above referred to. Instead of the cylinders 34 and 35 and the rods 36 and 37 there is provided in lieu thereof a pair of rods 46 and 47 pivotally connecting the upper ends of the levers 20 and 21 and forward portions of the rods 25 and 26. Each of the rods 46 and 47 is provided with an integrally formed circular outer end 48 and 49, respectively, and each of the members 48 and 49 adapted to encircle the other rod.

In the form of the invention shown in Figure 6, instead of the power take-off above described, there is provided a pair of hydraulically operated devices comprising cylinders 50 with hydraulic connections 51 and 52 and attached by means of bolts 53 or the like to the frame of the tractor upon either side thereof. The cylinder is provided with a piston-actuated eye 54 each of which is adapted to encircle a cable 12 and 13 in which case the cables are fastened to hooks 55 or the like upon the framework of the tractor. It will be seen that in this form of the invention an outward movement of the eye 54 as indicated in dotted lines in Figure 6 will cause a rearward movement of the upper portions of the levers 20 and 21 and that the remainder of the operation of the invention will be identical to that as heretofore described.

While but certain forms of the invention have been shown and described herein, it will be readily apparent to those skilled in the art that many minor modifications may be made without departing from the spirit of the invention or the scope of the appended claims.

What is claimed is:

1. A loading attachment for tractors including, in combination, a shovel adapted to be carried by a tractor, means exclusive of the movement of the tractor for forwardly moving the shovel in lowered position and thereafter moving the shovel upwardly, said means comprising a drum adapted to be operated by the power take-off of the tractor, cables movable in unison by the drum, levers pivotally attached intermediate of their ends to the tractor and operable by said cables, rods interconnecting corresponding ends of the levers and the shovel, cylindrical members attached adjacent the shovel ends of the rods, links attached to the opposite ends of the levers and slidably mounted within the cylindrical members, and stops carried by the links whereby the outward movement of the links with respect to the cylindrical members is limited.

2. A loading attachment for tractors including, in combination, a shovel adapted to be carried by a tractor, means exclusive of the movement of the tractor for forwardly moving the shovel in lowered position and thereafter moving the shovel upwardly, said means comprising a source of power carried by the tractor, cables movable by the source of power, levers having upper and lower ends and pivoted intermediate of their ends to the sides of the tractor and operable by said cables, rods interconnecting the lower ends of the levers and the shovel, and extensible linkages interconnecting the upper ends of the levers and the rods adjacent the shovel.

3. A loading attachment for tractors including, in combination, a shovel adapted to be carried by a tractor, means exclusive of the movement of the tractor for forwardly moving the shovel in lowered position and thereafter moving the shovel upwardly, said means comprising a source of power carried by the tractor, cables movable by the source of power, levers having upper and lower ends and pivoted to the sides of the tractor and operable by said cables, rods interconnecting the lower ends of the levers and the shovel, and extensible linkages interconnecting the upper ends of the levers and the rods adjacent the shovel, said linkages each comprising a pair of shafts pivotally connected respectively to the lever and the rod at one of their ends and having looped opposite ends each encircling the other shaft.

4. A loading attachment for tractors including, in combination, a shovel adapted to be carried by a tractor, means exclusive of the movement of the tractor for forwardly moving the shovel in lowered position and thereafter moving the shovel upwardly, said means comprising levers having upper and lower ends and pivotally mounted upon either side of the tractor intermediate of their ends, a cable attached to the upper end of each of the levers and to the tractor, rods interconnecting the lower ends of the levers and the shovel, extensible linkages interconnecting the upper ends of the levers and the rods adjacent the shovel, and hydraulic means secured to the tractor for moving the cables for rocking the levers in one direction on their pivots.

5. A loading attachment for tractors including, in combination, a shovel adapted to be carried by a tractor, means exclusive of the movement of the tractor for forwardly moving the shovel in lowered position and thereafter moving the shovel upwardly, said means comprising levers pivotally mounted intermediate of their ends upon either side of the tractor and each having an upper and a lower end, a cable attached to the upper end of each of the levers and to the tractor, rods interconnecting the lower ends of the levers and the shovel, extensible linkages interconnecting the upper ends of the levers and the rods adjacent the shovel, and hydraulic means carried by the tractor for moving the cables, said last mentioned means comprising a hydraulically operated cylinder and piston mounted on either side of the tractor and adapted to force the cables out of a straight line whereby to move the upper ends of the levers rearwardly.

6. A loading attachment for tractors comprising a lever adapted to be pivotally mounted intermediate of its ends on a tractor for swinging movement in substantially a vertical plane and having an upper and a lower end, a rod pivotally connected to the lower end of said lever and extending forwardly therefrom, a shovel mounted on the forward end of said rod, a link formed of non-detachable slidably connected sections having one end pivotally connected to the upper end of said lever and its opposite end connected to said rod adjacent the shovel, and means for rocking said lever for swinging the lower end thereof forward and the upper end thereof rearwardly for causing the shovel to be initially displaced forwardly of the tractor as the slidable linkage is moved to an extended position and for thereafter causing the shovel to be elevated by the rearward movement of said linkage as a unit.

LOUIE W. SMITH.

REFERENCES CITED

The following references are of record in the file of this patent:

UNITED STATES PATENTS

| Number | Name | Date |
| --- | --- | --- |
| 1,597,620 | Parkey | Aug. 24, 1926 |
| 1,623,194 | Marshall | Apr. 5, 1927 |
| 2,109,388 | Heller | Feb. 22, 1938 |
| 2,264,050 | Newell | Nov. 25, 1941 |
| 2,413,096 | Barker | Dec. 24, 1946 |
| 2,413,097 | Barker | Dec. 24, 1946 |
| 2,441,070 | Hoover | May 4, 1948 |